United States Patent Office 3,095,898
Patented July 2, 1963

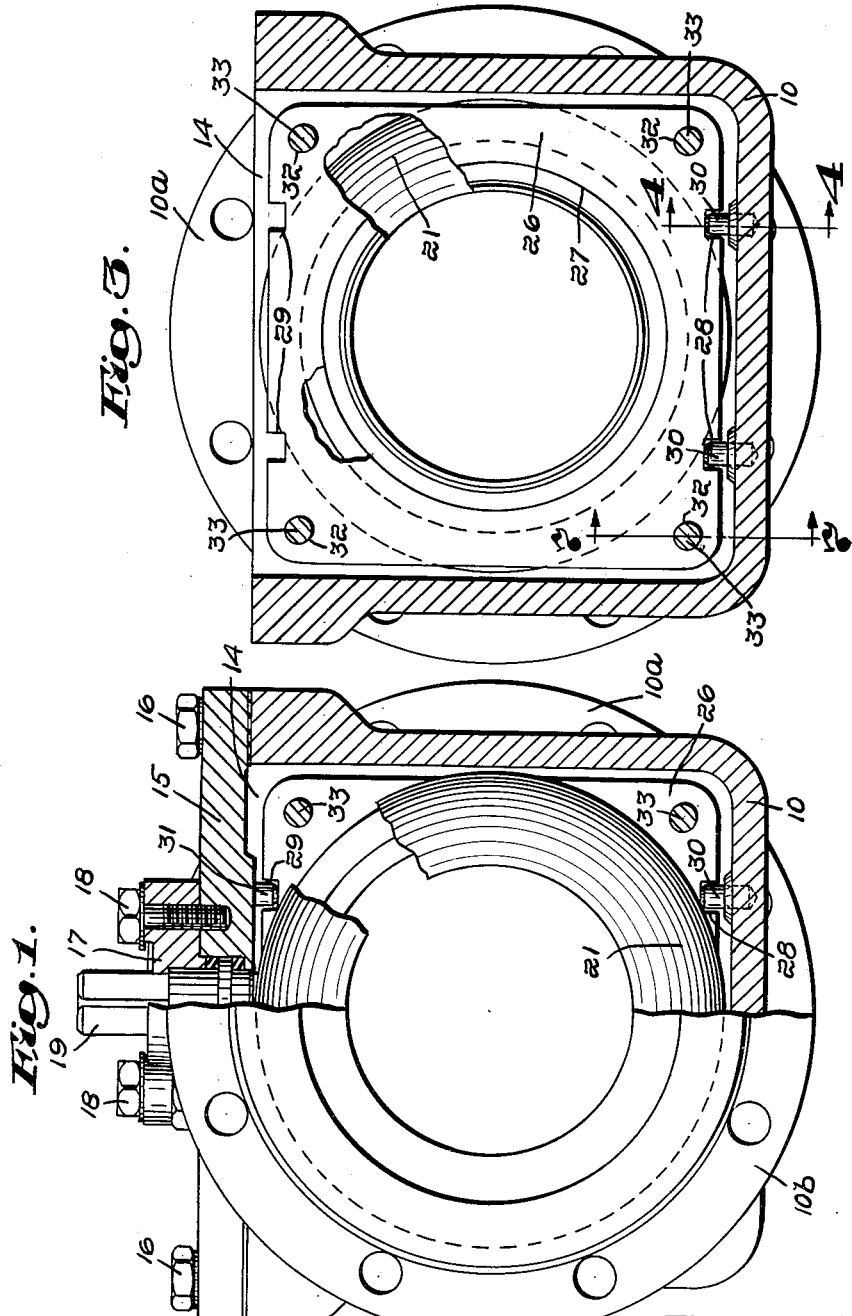

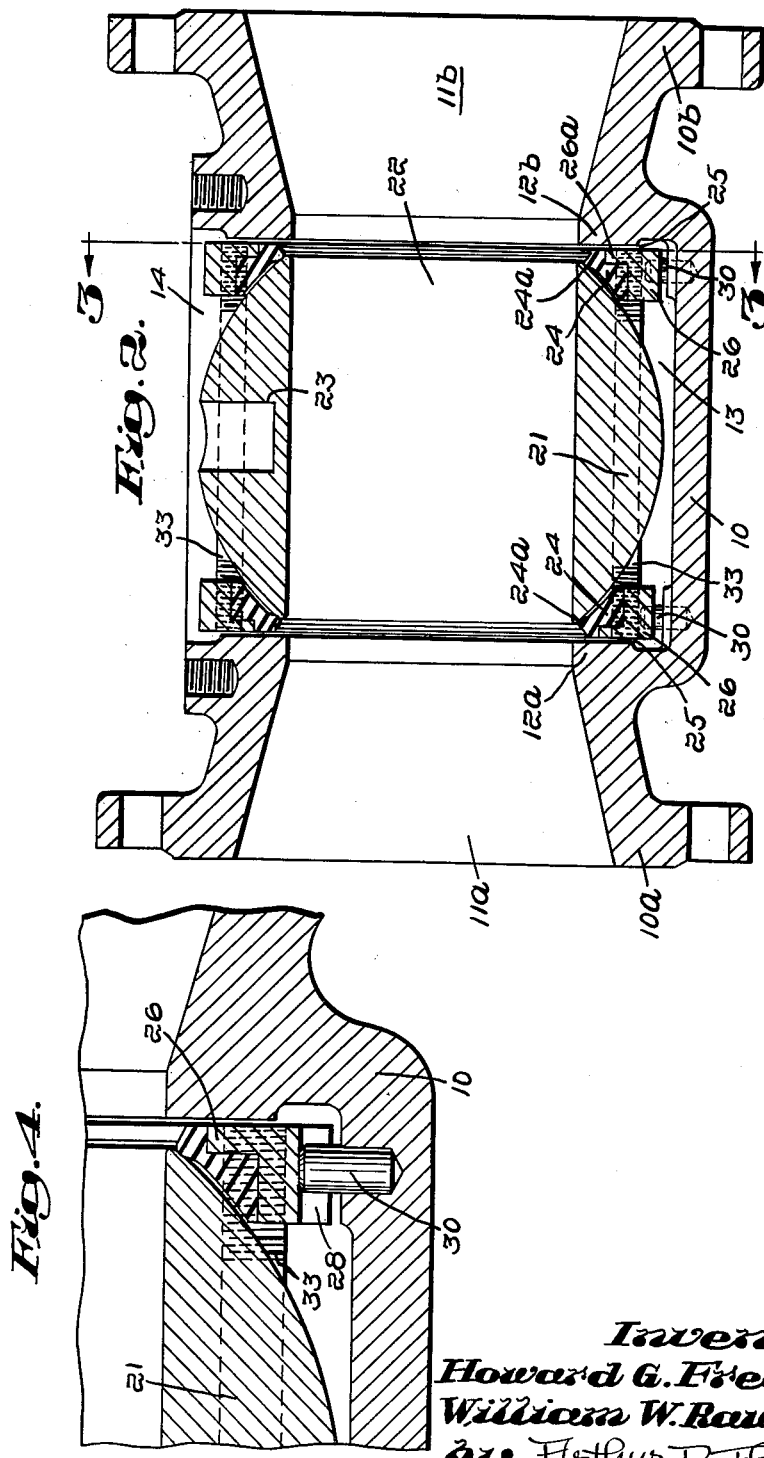

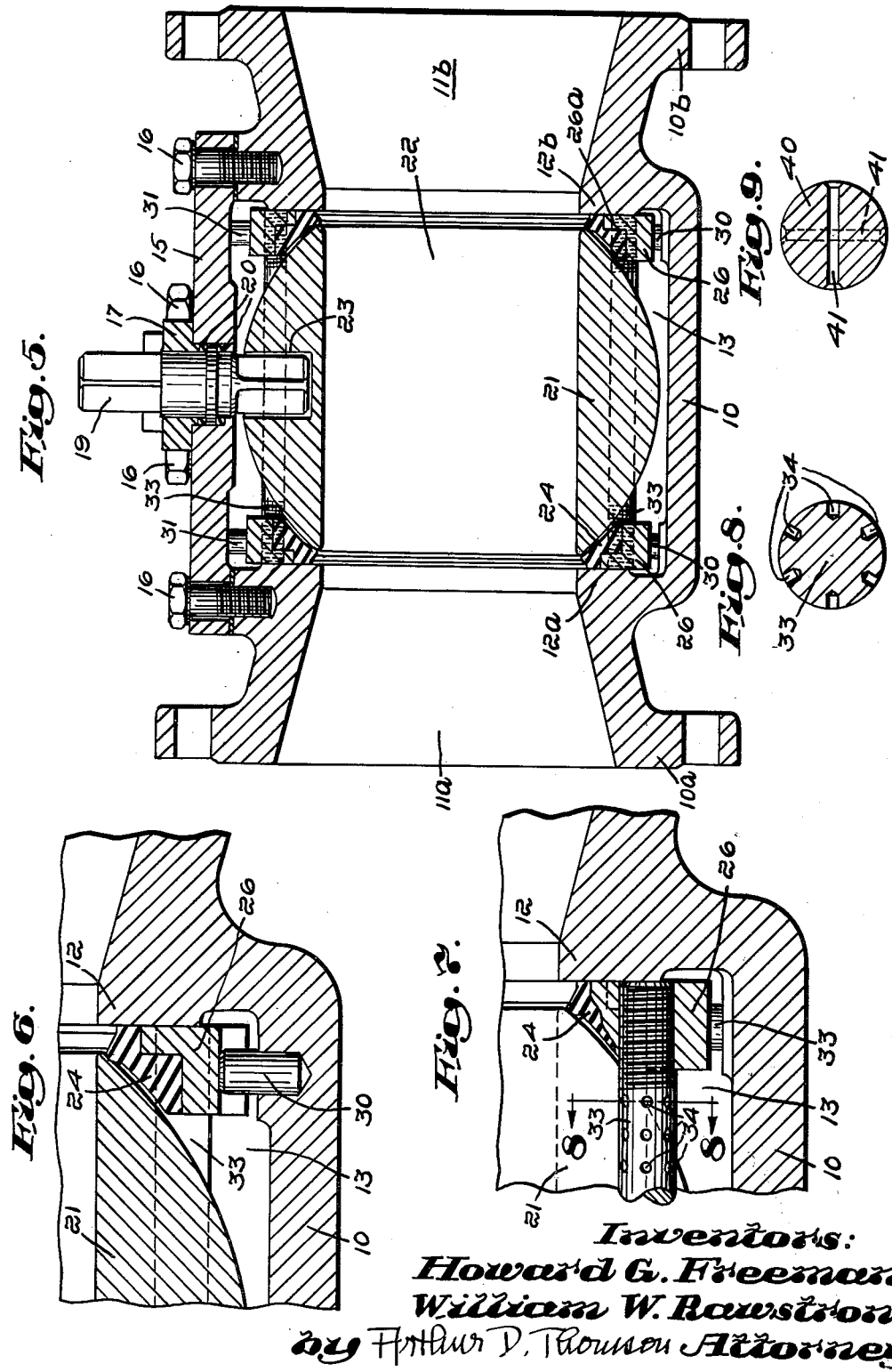

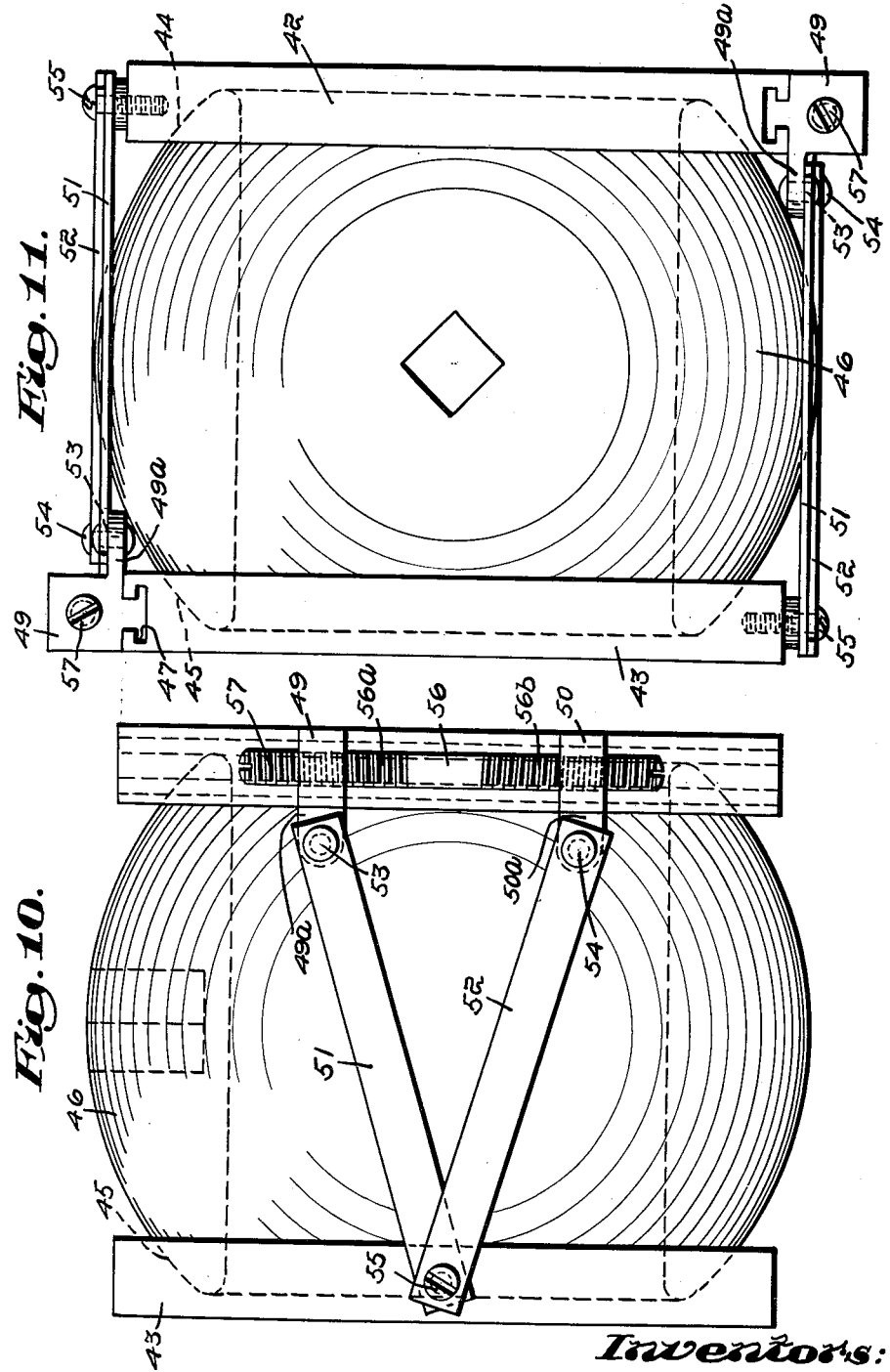

---

3,095,898
REMOVABLE BALL AND SEAT VALVE UNIT
Howard G. Freeman and William W. Rawstron, Worcester, Mass., assignors to Jamesbury Corp., Worcester, Mass., a corporation of Massachusetts
Filed Dec. 2, 1960, Ser. No. 73,237
6 Claims. (Cl. 137—454.2)

This invention relates to ball valves and pertains more particularly to improvements in valves of the type described in Patent No. 2,945,666, dated July 19, 1960.

Ball valves of the type described in the aforesaid patent have a pair of sealing rings, one on each side of the ball, with flexible lips engaging the ball to form a seal on both the upstream and the downstream side. The valve chamber is of such a length as to produce initial deflection of the lips. In the previous construction, the casing is made in two sections which are assembled together endwise. When replacement of the rings is required, it is necessary to disconnect the valve from the pipe line in order to take the casing apart.

The principal object of this invention is to provide a ball valve which is easy to assemble initially and on which repairs, such as replacement of the rings, may be made, after the valve is installed, without disconnecting the valve casing from the pipe line. Other objects, advantages, and novel features will be apparent from the following description.

The valve here disclosed has a one-piece casing or body with provision at both ends for connection to piping. The casing has a top opening leading to the valve chamber. The ball and rings are secured together by end plates connected by a linkage which permits the distance between the plates to be varied. This assembly is inserted into the valve chamber through the top opening, with the plates drawn close enough together to permit easy insertion into the chamber. The linkage is then adjusted so that the plates bear on the end walls of the chamber. A cover plate, which carries the bonnet and stem assembly, is attached to the valve body to cover the top opening. After the valve is installed in a pipe line, removal of the cover plate gives access to the ball and seat assembly. By means of the linkage, the plates may be drawn together so that the assembly can be readily removed.

In the drawings illustrating the invention:

FIG. 1 is a view taken from one end of a valve constructed according to the invention, showing the valve partly in elevation and partly in cross-section in the region of one of the end plates;

FIG. 2 is a cross-section taken along the longitudinal center line of the valve, showing the ball and seat assembly in the process of installation;

FIG. 3 is a cross-section, partly broken away, taken along line 3—3 of FIG. 2;

FIG. 4 is a fragmentary, enlarged cross-section taken along line 4—4 of FIG. 3;

FIG. 5 is a cross-section taken along the same line as FIG. 2 but showing the valve assembly completed;

FIG. 6 is a fragmentary enlarged cross-section, taken along the same line as FIG. 4 after completion of the assembly;

FIG. 7 is an enlarged fragmentary cross-section taken along line 7—7 of FIG. 3 after completion of the assembly;

FIG. 8 is an enlarged fragmentary cross-section taken along line 8—8 of FIG. 7;

FIG. 9 is a fragmentary side view of a modified form of tie rod used in the linkage shown in FIGS. 1 through 8;

FIG. 10 is a side elevation of a ball and plate assembly having a modified form of linkage; and FIG. 11 is a plan view of the assembly of FIG. 10.

The valve casing or body 10 is generally tubular at the ends and rectangular in the mid portion, and has flanges 10a and 10b, surrounding end openings 11a and 11b, for connection to piping. It is understood that other types of connections may be provided, for example, the ends of the body may be internally threaded. The body has internal shoulders 12a and 12b, defining the ends of the valve chamber 13. The body has a top opening 14 communicating with chamber 13, preferably extending the full length and width of the chamber.

The cover plate 15 is generally rectangular and is secured to the body 10 by bolts 16. A bonnet 17 is mounted on the cover plate and secured thereto by means of bolts 18. The bonnet holds in place the valve stem 19 which passes through the cover plate to the interior of the valve. O-rings 20 provide a seal between the stem and bonnet.

The ball 21 is of the usual type having a through opening 22, and a recess 23 for receiving the inner end of the stem. The ball is intended to be turned by the stem between an open position in which the through opening is aligned with openings 11a and 11b, and a closed position in which opening 22 is disposed transversely across the valve body.

A pair of circular seal rings 24, which are duplicates in construction but reversed in position, are disposed one on each side of the ball. Each ring has a flexible lip 24a which engages the ball to form a seal, as in the patented construction previously referred to. The rings have circular grooves 25 in their outer ends. The ringe are seated in rectangular end plates 26 which are also duplicates in construction but reversed as to position. Each plate has a circular opening 27, and is recessed around the opening, on the side nearest the ball, to form a shoulder 26a which is received in the groove 25 of the corresponding ring.

Each plate has a pair of longitudinal grooves 28 at the bottom and a similar pair of longitudinal grooves 29 at the top. Two pairs of pins 30 are mounted on body 10 in the bottom of the valve chamber, and each pair engages the bottom grooves 28 of one of the end plates. Two similar pairs of pins 31 are mounted on the under side of the cover plate 15, and each pair engages the top grooves 29 of one of the end plates when the cover plate is in place. The pins 30 and 31 keep the ball and seat assembly centered in the transverse direction of the valve chamber while permitting longitudinal movement of the end plates 26, or of the ball and seat assembly as a whole.

Each of the end plates 26 has internally threaded holes 32 in its four corners outside the area covered by the seat ring 24. Four tie rods 33 with threaded ends engage these holes. The holes of one plate and mating ends of the tie rods have right-hand threads, and the holes of the other plate and mating ends of the tie rods have left-hand threads, so that the end plates 26 are moved apart or together by turning the tie rods in one direction or the other. Preferably the tie rods have a series of spaced recesses 34 at various circumferential and longitudinal positions, so that an appropriate tool may be inserted into the valve chamber at any convenient location to turn the rods after the ball assembly is in place.

To assemble the valve, the ball and seat assembly, consisting of the ball 21, rings 24, end plates 26 and tie rods 33 is assembled outside the valve body. The tie rods are turned to draw the end plates together until the longitudinal dimension of the assembly is less than the distance between the opposed faces of shoulders 12a and 12b which define the length of the valve chamber. The ball and seat assembly may thus be easily inserted into the valve chamber through top opening 14. As shown in FIG. 2, there is clearance at this stage between the end plates and shoulder 12a, 12b.

After the ball and seat assembly is in place, the tie rods 33 are turned to move the end plates apart until they engage against shoulders 12a and 12b. The relative dimensions of the parts are previously calculated so that the desired amount of deflection of lips 24a is produced when the end plates engage the ends of the valve chamber.

To complete the valve assembly, the cover plate 15, on which the bonnet and stem have already been assembled, is placed over the top opening 14 and secured.

If replacement of the seat rings 24 becomes necessary, the cover plate 15 is removed, and tie rods 33 are turned to draw the end plates together sufficiently so that the ball and seat assembly may be drawn out easily. After the rings 24 have been replaced, the ball and seat assembly is returned to the body in the same manner as in originally constructing the valve. This repair can be performed without disconnecting the body 10 from the pipe line.

The tie rods may be made more readily accessible by turning the ball to the closed position to leave more room at the sides of the valve chamber.

The form of tie rod 40 illustrated in FIG. 9 is especially suitable for valves of small sizes, and may be used in place of rods 33. Rod 40 has holes 41 passing entirely through and arranged in staggered relationship. The holes may thus be of larger size in proportion to the diameter of the rod than the recesses in rod 33. This feature permits the use of a tool of reasonable size, and adequate stiffness, for turning a rod of small size.

The ball and seat assembly shown in FIGS. 10 and 11 has a pair of end plates 42 and 43, on which seat rings 44 and 45 are mounted. The rings are similar to rings 24 in the assembly previously described, and are mounted on the plates and engage the ball 46 in the same manner. Plate 42 has a pair of T-shaped guide slots 47 and 48 into which a pair of sliding nuts 49 and 50 are keyed. The nuts carry lugs 49a and 50a to which a pair of links 51 and 52 are pivotally connected by means of pins 53 and 54, respectively. The links are pivotally connected at their opposite ends to plate 43 by means of pin 55. A rod 56 has oppositely threaded ends 56a, 56b engaging nuts 49 and 50, respectively, the nuts being correspondingly threaded. By turning rod 56, nuts 49 and 50 may be moved toward or away from each other, thus lengthening or shortening the linkage to adjust the distance between the end plates. Rod 56 has a slot 57 at the top to receive a screw driver.

On the side of the ball opposite from the linkage just described is a similar linkage, generally indicated by the numeral 58, preferably reversed in position so that the end plates may be duplicates. By means of the two linkages, end plates 43 and 44 may be drawn together sufficiently to permit the assembly to be readily inserted into the valve chamber 13 of the casing shown in FIGS. 1 through 5. When the assembly is in place, the linkages are adjusted by means of their respective threaded rods so that the end plates bear on the end walls of the chamber. The assembly may be removed for repair by drawing up on the linkage to permit it to slide out readily.

Replacement of the valve seats, which are the only parts which normally require replacement in this type of valve, without disconnecting the valve body from the pipe line, results in great saving in time and labor, and eliminates the danger of the damage to the pipe line which often results from attempts to free a tightly threaded or corroded joint. This construction also makes it feasible, where desired, to connect the valve body permanently, for example by welding. In addition to these advantages, this construction has the further advantage of being easier to dismantle and reassemble in any case. To remove a ball and seat assembly which is inserted through the end of the valve body, it is necessary first to dismantle the bonnet and stem. In this construction the bonnet and stem assembly, and even a handle attached to the stem, may be lifted off as a unit with the cover plate.

What is claimed is:

1. A ball valve comprising a hollow valve casing having a longitudinal direction and longitudinally spaced inner end walls defining a valve chamber and inlet and outlet passages through said end walls communicating with said chamber, a ball and seat assembly disposed between said end walls, said assembly including a yieldable sealing member engaging said ball, and adjustable means independent of said casing for constricting said assembly to a dimension less than the spacing of said end walls in the longitudinal direction of said casing, said casing having a side opening of a size to admit said assembly when restricted to said dimension communicating with said chamber, and a cover closing said opening and secured to said body.

2. A ball valve comprising a hollow valve casing having a valve chamber and spaced internal shoulders constituting end walls of said chamber, said body having inlet and outlet passages through said end walls communicating with said chamber, a ball disposed in said chamber and having a through passage, said ball being rotatable between in open position in which said through passage is aligned with said inlet and outlet passages and a closed position, a pair of end plates one disposed between said ball and each of said end walls and each having an opening, a pair of flexible seal rings, one mounted on each of said plates around the opening thereof and engaging said ball, and means connecting said end plates together, said means being adjustable to draw said plates toward each other and constrict the assembly consisting of said ball, plates and seal rings to a dimension less than the spacing between said end walls, and said casing having a side opening of a size to admit said assembly when constricted to said dimension.

3. A ball valve comprising a hollow valve body having a valve chamber and spaced internal shoulders constituting end walls of said chamber, said body having inlet and outlet passages through said end walls communicating with said chamber, a ball disposed in said chamber and having a through passage, said ball being rotatable between an open position in which said through passage is aligned with said inlet and outlet passages and a closed position, a pair of end plates one disposed between said ball and each of said end walls and each having an opening, a pair of flexible seal rings, one mounted on each of said plates around the opening thereof and engaging said ball, and a plurality of tie rods connecting said plates, each of said rods having oppositely threaded portions, one threadably engaging each of said plates, and said rods being turnable to vary the distance between said plates.

4. A ball valve as described in claim 3, each of said rods having a plurality of tool receiving recesses.

5. A ball valve as described in claim 3, each of said rods having a plurality of transverse holes adapted to receive a tool for turning the rod.

6. A ball valve comprising a hollow valve body having a valve chamber and spaced internal shoulders constituting end walls of said chamber, said body having inlet and outlet passes through said end walls communicating with said chamber, a ball disposed in said chamber and having a through passage, said ball being rotatable between an open position in which said through passage is aligned with said inlet and outlet passages and a closed position, a pair of end plates one disposed between said ball and each of said end walls and each having an opening, a pair of flexible seal rings, one mounted on each of said plates around the opening thereof and engaging said ball, and a pair of linkages connecting said plates, each linkage comprising a pair of links pivotally connected to one of said plates, a pair of nuts slidably mounted on the other of said plates, said links being pivotally connected to said nuts, and a rod having oppositely threaded portions engaging said nuts.

References Cited in the file of this patent

UNITED STATES PATENTS

| | | |
|---|---|---|
| 1,086,221 | Reynolds | Feb. 3, 1914 |
| 2,297,161 | Newton | Sept. 29, 1942 |
| 2,883,146 | Knox | Apr. 21, 1959 |

FOREIGN PATENTS

| | | |
|---|---|---|
| 915,764 | Germany | July 29, 1954 |
| 1,060,677 | Germany | July 2, 1959 |